(No Model.)
A. I. McCANDLESS.
LISTED CORN CULTIVATOR.
No. 339,452. Patented Apr. 6, 1886.
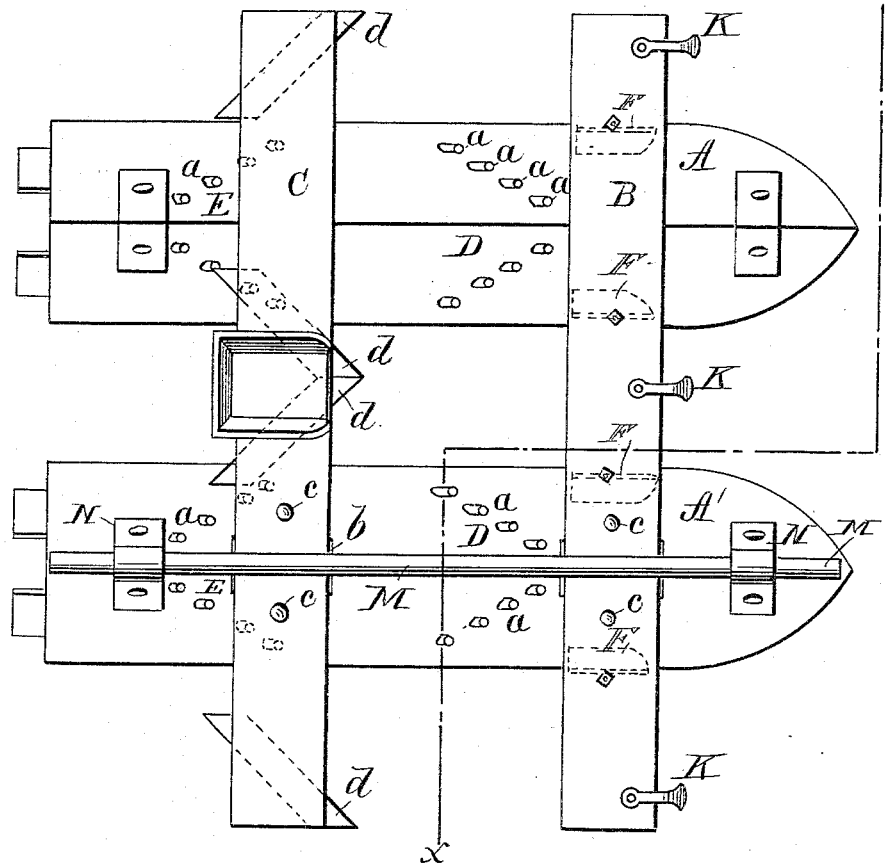
Fig. 1.
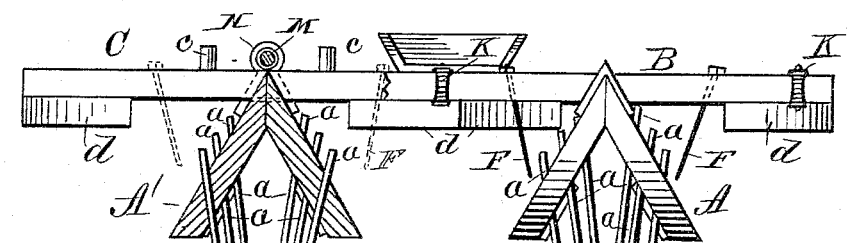
Fig. 2.
WITNESSES:
INVENTOR:
A. I. McCandless
BY 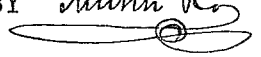
ATTORNEYS.

UNITED STATES PATENT OFFICE.

ALBERT ISRAEL McCANDLESS, OF VINING, KANSAS.

LISTED-CORN CULTIVATOR.

SPECIFICATION forming part of Letters Patent No. 339,452, dated April 6, 1886.

Application filed February 10, 1886. Serial No. 191,500. (No model.)

*To all whom it may concern:*

Be it known that I, ALBERT ISRAEL MC-CANDLESS, of Vining, in the county of Clay and State of Kansas, have invented a new and Improved Listed-Corn Cultivator, of which the following is a full, clear, and exact description.

The object of my invention is to provide a cheap, light, and durable cultivator adapted for use in cultivating listed corn for the first, and possibly the second, time; and the invention consists of certain details of construction and combinations of parts, to be hereinafter described, and specifically pointed out in the claims.

Reference is to be had to the accompanying drawings, forming a part of this specification, in which similar letters of reference indicate corresponding parts in both the figures.

Figure 1 is a plan view of my improved form of cultivator, and Fig. 2 is a sectional view of the same, taken on broken line $x\ x$ of Fig. 1.

The cultivator consists of two troughs, A A', one of which is rigidly connected to the front and rear cross-bars, B C, while the other is movably connected to said cross-bars, in a manner to be hereinafter more specifically described.

A number of steel pins, $a\ a$, are mounted in the sides of the troughs A A', said pins being arranged in sets D and E, of which the set D is composed of pins arranged in lines which converge toward the forward end of the trough, while the set E consists of pins arranged in lines that converge toward the rear of the trough, all of the pins being so arranged as to project downward to about two and a half inches below the level of the bottoms of the troughs, and all being arranged so as to project at a slight angle toward the rear of the troughs.

Half-moon cutters F F F F are carried by the cross-bar B, four of these cutters being employed, one being arranged on either side of each trough.

As before stated, the trough A is rigidly fixed to the cross-bars; but the trough A' is fixed so that it may move outward or inward between the limit-pins $c\ c$, the upper edge of the trough being formed with recesses $b\ b$, through which the cross-bars pass, and being provided with metallic straps N N, which pass over the metallic rod M, arranged, as shown, above the cross-bars B and C. Upon the under side of the cross-bar C, I arrange four stops, $d\ d$. The front cross-bar, B, is provided with three clevises, K K K, so that the device may be drawn by either one, two, or three animals, the intention being to employ two or three.

This cultivator may be used very advantageously in the cultivation of young listed corn, and will be found to bring down the loose earth to the corn without ever covering it up, all weeds on the slopes being cut down by the cutters, so that the corn is left in better growing shape than with any of the cultivators now in use.

The slight play given to the trough A' enables it to accurately follow any irregularities there may be in the laying out of the rows.

Having thus fully described my invention, what I claim as new, and desire to secure by Letters Patent, is—

1. In a cultivator, the combination, with the cross-bars, of a stationary and a movable trough provided with pins $a\ a$, substantially as described.

2. In a cultivator, the combination, with a frame, of a stationary and a movable trough carrying teeth $a\ a$, arranged in sets D E, substantially as described.

3. In a cultivator, the combination, with cross-bars, one of which carries cutters F, of a stationary trough, A, and a movable trough, A', both troughs being provided with pins, substantially as described.

ALBERT ISRAEL McCANDLESS.

Witnesses:
J. A. STOBER,
HENRY COOPER.